Feb. 25, 1958  M. W. SCHWARTZ  2,824,752
MOTOR VEHICLE LOAD COMPENSATOR
Filed Feb. 29, 1956
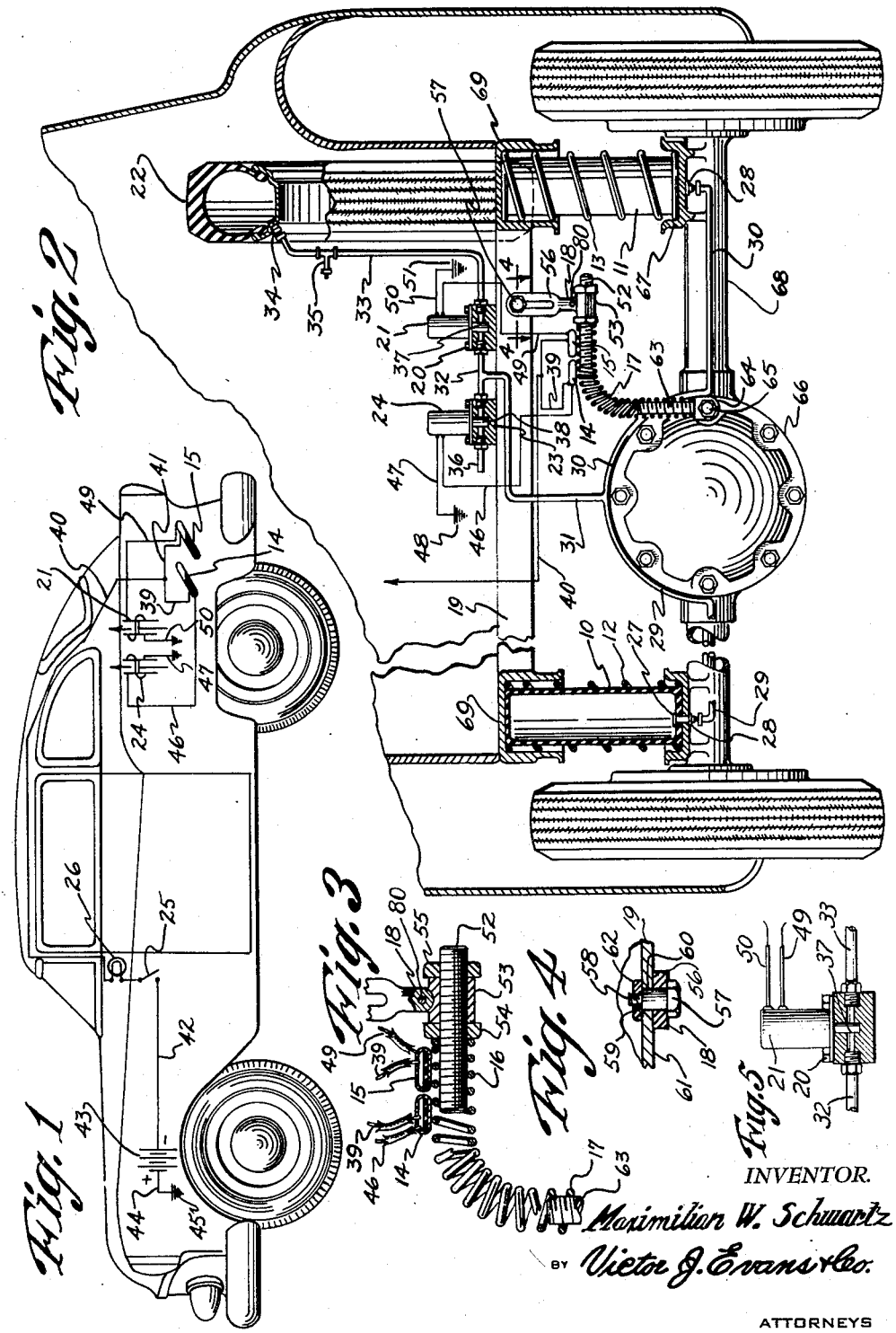
INVENTOR.
Maximilian W. Schwartz
BY Victor J. Evans & Co.
ATTORNEYS

United States Patent Office 2,824,752
Patented Feb. 25, 1958

2,824,752

MOTOR VEHICLE LOAD COMPENSATOR

Maximilian W. Schwartz, New Castle, Pa.

Application February 29, 1956, Serial No. 568,463

5 Claims. (Cl. 280—124)

This invention relates to load compensating devices for use with motor vehicles of the type wherein the chassis is supported from the rear axle with vertically disposed coil springs which are compressed under heavy loads, and in particular switches, valves and connecting elements whereby excessive loads carry the chassis of the vehicle downwardly tilting a mercury switch which completes a circuit to a solenoid that opens a valve admitting air under pressure from a spare tire of the vehicle to tubes in coil springs connecting the chassis to the rear axle wherein air pressure in the tubes supplements the resistance of the springs elevating the chassis and bringing the rear portion of the vehicle back to a conventional operating position.

The purpose of this invention is to provide means for increasing the resistance of supporting elements between the chassis and front and rear axles of a vehicle to compensate for heavy loads in the body of the vehicle.

To meet the demand for easy riding vehicles the springs of some vehicles are comparatively small. It is difficult to obtain the same degree of flexibility when the vehicle is occupied by a single one hundred pound operator as when the vehicle is occupied with five or six two hundred pound individuals. With this thought in mind this invention contemplates auxiliary means for providing additional resistance to supplement the tension of springs of a vehicle when the vehicle is loaded and particularly when the load exceeds contemplated capacity of the vehicle.

The object of this invention is, therefore, to provide auxiliary means for supplementing the resistance of the springs of a vehicle when the load of the vehicle is excessive.

Another object of the invention is to provide compensating means for supplementing the conventional springs of a vehicle when the vehicle is subjected to increased loads in which the auxiliary means is adapted to be installed in vehicles now in use.

A further object of the invention is to provide load compensating means adapted to be incorporated in a motor vehicle in which the said load compensating means is of simple and economical construction.

With these and other objects and advantages in view the invention embodies sealed tubular elements adapted to be positioned in vertically disposed coil springs with connections from the tubular elements to a spare tire of the vehicle and with valves and manual and automatic control elements whereby the air of the spare tire may be applied to the tubular elements to supplement tension of the springs of the vehicle.

Other features and advantages of the invention will appear from the following description taken in connection with the drawing, wherein:

Figure 1 is a side elevational view of the vehicle showing a wiring diagram adapted to be used in combination with the load compensating elements of the invention.

Figure 2 is a cross section through the rear portion of a motor vehicle with the parts shown on an enlarged scale showing the tubular elements in vertically disposed coil springs extended between the rear axle housing and chassis of the vehicle, one of the tubular elements and the spring in combination therewith being shown in section.

Figure 3 is a view showing the mounting of mercury switches on a horizontal section of a spring element adapted to be mounted on the rear axle of the vehicle and adapted to be retained with the extended end horizontal by a bracket carried by the chassis of the vehicle.

Figure 4 is a sectional plan taken on line 4—4 of Fig. 2 showing the connection of the bracket of the spring element on which the mercury switches are positioned to the chassis of the vehicle.

Figure 5 is a cross section through one of the solenoid actuated valves with the parts shown on an enlarged scale.

Referring now to the drawing wherein like reference characters denote corresponding parts the improved motor vehicle load compensator of this invention includes tubular elements 10 and 11 of resilient material, such as rubber mounted in springs 12 and 13, respectively, mercury switches 14 and 15 mounted on a horizontal section 16 of a flexible member or spring 17, a bracket 18 connecting the extended end of the member 17 to the chassis 19 of the vehicle, a valve 20 actuated by a solenoid 21 for admitting air from a spare tire 22 to the tubes 10 and 11, a valve 23 actuated by a solenoid 24 for releasing air from the tubes 10 and 11 to the atmosphere and a manually actuated control switch 25 in the circuit of the solenoids and mercury switches and adapted to be mounted in combination with a pilot light 26 on the instrument panel of a vehicle on which the load compensator is installed.

The tubes 10 and 11 are positioned in the springs 12 and 13, as illustrated in Fig. 2 of the drawing and the lower ends of the tubes are provided with studs 27 and 28 to which tubes 29 and 30 are connected and the tubes 29 and 30 extend to a tube 31 which extends from a T-connection 32 one side of which is connected to the valve 20 and the other to the valve 23. The opposite side of the valve 20 is connected by a tube 33 to a valve connection 34 of the spare tire 22 and the connection 33 is provided with a valve 35 whereby the connection is adapted to be manually closed to permit refilling the spare tire with air under pressure.

The side of the valve 23 opposite to that to which the connection 32 is connected is provided with a tube 36 that is open to the atmosphere.

The valve 20 is provided with a plunger 37 that is positioned to close a passage through the valve body and the plunger 37 is actuated by the solenoid 21 to open the valve. The valve 23 is also provided with a plunger 38 and the plunger 38 is adapted to be actuated by the solenoid 24 to open the valve.

One of the terminals of the mercury switch 14 is connected by a wire 39 to a wire 40 which extends to the switch 25 on the instrument panel of the vehicle and the wire 40 is also connected to a terminal of the mercury switch 15 through a wire 41. The opposite side of the switch 25 is connected by a wire 42 to one side of a battery 43 and the opposite side of the battery is connected by a wire 44 to the chassis of the vehicle providing a ground, as indicated by the numeral 45. The opposite side of the mercury switch 14 is connected by a wire 46 to one side of the solenoid 24 and the opposite terminal of the solenoid is connected by a wire 47 to a ground 48. The opposite terminal of the mercury switch 15 is connected by a wire 49 to one side of the solenoid 21 and the opposite terminal of the solenoid is connected by a wire 50 to a ground, as indicated by the numeral 51.

The horizontal section 16 of the spring 17 on which the mercury switches 14 and 15 are mounted extends over the end of a threaded stud 52 which is secured in a hub 53 of the bracket 18 with nuts 54 and 55 and the opposite end of the bracket, which is provided with a slot 56 is secured to the chassis 19 with a bolt 57 which extends through the slot. As illustrated in Fig. 4 the bolt 57 is provided with a threaded stud 58 providing a shoulder 59 which extends through an opening 60 in a wall 61 of the chassis and with the bolt secured in position with a nut 62 the bracket 18 is clamped to the chassis and moves downwardly as the chassis moves in the conventional manner with a relatively light load. With an excessive load in the vehicle the bracket moves the end of the spring 17 with the mercury switches thereon downwardly completing a circuit through the switch 15 and breaking the circuit through the switch 14 whereby, with the switch 25 closed, air under pressure in the spare tire is admitted to the tubes 10 and 11.

The lower end of the spring 17 is also provided with a threaded stud 63 that extends from a clevis 64 on a bolt 65 of the differential housing 66. It will be understood, however, that the lower end of the spring 17 may be mounted by other suitable means.

In the design shown the lower ends of the springs 12 and 13 are positioned in seats 67 on the rear axle housing 68 and the upper ends are positioned in caps 69 of the chassis 19.

The bracket 18 is pivotally connected with a pin 80 to the sleeve 53 to facilitate downward movement of the horizontally disposed portion of the spring 17 and also of the stud 52.

Operation

The mounting of the elements on the vehicle is only suggestive as the relative positions of the chassis and rear axle housing are different with different makes of vehicles. However, with the compensator tubes 10 and 11 positioned in the coil or flat springs extended between the chassis and axle or axles of a vehicle and with the mercury switches and solenoid actuated valves arranged as illustrated and described the vehicle is adapted to be used in the conventional manner with a single operator or with the operator and one passenger and as load in the vehicle is increased, such as by passengers in the rear seat and baggage in the trunk the bracket 18 forces the extended end of the spring 17 downwardly completing a circuit through the mercury switch 15 and with the switch 25 closed the circuit completed by the switch 15 closes the circuit to the solenoid 21 whereby the valve 20 is opened and with the valve 34 open air under pressure from a spare tire passes to the tubes 10 and 11 forcing the tubes to extend and elevating the chassis and rear portion of the vehicle to the conventional position. The tension of the springs 12 and 13 is, therefore, supplemented by air pressure in the tubes 10 and 11 when excessive weight is applied to the vehicle.

Upon removal of the passengers or load the end 16 of the spring 17 returns to the horizontal position breaking the circuit to the switch 15 permitting the valve 20 to close and closing the circuit of the valve 14 whereby the solenoid 24 opens the valve 23 and permits air in the tubes 10 and 11 to escape to the atmosphere.

The air withdrawn from the spare tire 22 may be replenished at the first filling station.

Although the device is illustrated as being applied to the rear axle of a vehicle it will be understood that it may also be applied to the front axle and also to parts of a trailer or the like.

It will be understood that modifications, within the scope of the appended claims, may be made in the design and arrangement of the parts without departing from the spirit of the invention.

What is claimed is:

1. A load compensator comprising sealed tubes, a supply reservoir, a supply tube connecting the sealed tubes to the reservoir, a solenoid actuated pressure valve in the supply tube, a chassis upon which the supply reservoir is positioned, a rear axle assembly, a coil spring having a vertically disposed section and a horizontally disposed section, means mounting the vertically disposed section of the spring on the rear axle assembly, a bracket connecting the extended end of the horizontally disposed section of the coil spring to the chassis, electric switches mounted on the horizontally disposed section of the coil spring, one of said switches being positioned to complete a circuit to the solenoid of the pressure valve, for opening the valve to admit air from the supply reservoir to the sealed tubes upon the application of a load to an object upon which the device is installed, and means for releasing air from the sealed tubes upon removal of said load.

2. A load compensator comprising sealed tubes, a supply reservoir, a supply tube connecting the sealed tubes to the reservoir, a solenoid actuated pressure valve in the supply tube, a chassis upon which the supply reservoir is positioned, a rear axle assembly, a coil spring having a vertically disposed section and a horizontally disposed section, means mounting the vertically disposed section of the coil spring on the rear axle assembly, a bracket connecting the extended end of the horizontally disposed section of the coil spring to the chassis, electric switches mounted on said horizontally disposed section of the coil spring, one of said switches being positioned to complete a circuit to the solenoid of the pressure valve for opening the pressure valve of the supply tube to admit air from the reservoir to the sealed tubes upon the application of a load to an object upon which the device is installed, and another of said switches being positioned to close a circuit to actuate the valves for closing the reservoir and opening the sealed tubes to the atmosphere upon the removal of said load.

3. In a motor vehicle, the combination which comprises a chassis, a rear axle assembly having a housing, vertically disposed coil springs extended between the rear axle housing and chassis, sealed tubes of flexible material positioned in said springs, a spare tire providing a reservoir, a tube extended from the spare tire to the sealed tubes, a valve in the tube extended from the spare tire to the sealed tubes, a mercury switch, a coil spring mounted on the rear axle housing and having a vertically disposed section extended from the housing and a horizontally disposed section, a bracket connecting the extended end of the horizontally disposed section to the chassis for mounting the mercury switch whereby upon downward movement of the chassis in relation to the rear axle a circuit is completed to the mercury switch, means for opening the valve in the tube connecting the spare tire to the sealed tubes upon completion of the circuit to the mercury switch, a relief valve, a second mercury switch positioned on the horizontally disposed section of the coil spring and connected in a circuit to the relief valve whereby upon upward movement of the chassis the relief valve is opened releasing air in the sealed tubes to the atmosphere.

4. In a motor vehicle, the combination which comprises a chassis, a rear axle assembly having a housing, vertically disposed coil springs extended between the rear axle housing and chassis, sealed tubes of flexible material positioned in said springs, a spare tire providing a reservoir, a tube extended from the spare tire to the sealed tubes, a pressure valve in the tube extended from the spare tire to the sealed tubes, a mercury switch, means for mounting the mercury switch on the vehicle whereby upon downward movement of the chassis in relation to the rear axle a circuit is completed by the mercury switch, for opening the pressure valve in the tube connecting the spare tire to the sealed tubes upon completion of the circuit to the mercury switch, a relief valve, another mercury switch carried by the mounting means of the former mercury switch and positioned to complete a circuit to the relief valve for opening the sealed tubes to the atmosphere upon the return movement of the chassis, and a switch adapted to be positioned at a point within the vehicle to facilitate operation thereof by an operator of the vehicle, said switch being connected in the circuits of the mercury switches.

5. In a load compensator, for use on a motor vehicle, the combination which comprises a motor vehicle including a chassis, a rear axle assembly including a rear axle housing and coil springs positioned between the rear axle housing and chassis, said vehicle also having an instrument panel, sealed tubes of flexible material positioned in the springs between the chassis and rear axle housing, a spare tire carried by the vehicle, a supply tube extended from the spare tire to said sealed tubes, a solenoid actuated pressure valve in the supply tube, a coil spring mounted on the rear axle housing, a bracket connecting an extended end of the spring to the chassis of the vehicle, said bracket retaining the extended end of the spring in a horizontally disposed position, a solenoid actuated relief valve connecting the supply tube to the atmosphere, mercury switches positioned on the horizontally disposed portion of the coil spring and connected by a circuit to the solenoids of the solenoid actuated valves whereby downward movement of the mercury switches completes a circuit to the solenoid of the pressure valve in the supply tube opening the valve and permitting flow of air from the spare tire to the sealed tubes, one of the mercury switches completing a circuit to the solenoid of the relief valve opening the supply tube to the atmosphere upon removal of the load, and a manually actuated switch positioned on the instrument panel of the vehicle and connected in the circuit of the solenoids of the valves to open and close said circuit as desired.

References Cited in the file of this patent

UNITED STATES PATENTS

| | | |
|---|---|---|
| 2,310,930 | Blanchett | Feb. 16, 1943 |
| 2,361,575 | Thompson | Oct. 31, 1944 |
| 2,427,927 | Schutte | Sept. 23, 1947 |
| 2,670,201 | Rossman | Feb. 23, 1954 |
| 2,710,184 | Pemberton | June 7, 1955 |